United States Patent [19]

Kiya

[11] Patent Number: 4,692,872

[45] Date of Patent: Sep. 8, 1987

[54] NUMERICAL CONTROL SYSTEM WITH PLURAL GROUPS OF MISCELLANEOUS FUNCTIONS

[75] Inventor: Nobuyuki Kiya, Hachioji, Japan

[73] Assignee: Fanuc LTD, Minamitsuru, Japan

[21] Appl. No.: 834,245

[22] PCT Filed: Jul. 5, 1985

[86] PCT No.: PCT/JP85/00380

§ 371 Date: Feb. 13, 1986

§ 102(e) Date: Feb. 13, 1986

[87] PCT Pub. No.: WO86/00726

PCT Pub. Date: Jan. 30, 1986

[30] Foreign Application Priority Data

Jul. 6, 1984 [JP]  Japan ................. 59-138930

[51] Int. Cl.$^4$ .................. G06F 3/04; G05B 19/18
[52] U.S. Cl. ..................... 364/474; 318/569
[58] Field of Search ........... 364/474, 475, 167, 168, 364/169, 170, 171; 318/567, 569, 570, 562

[56] References Cited

U.S. PATENT DOCUMENTS

| | | | |
|---|---|---|---|
| 4,068,297 | 1/1978 | Komiya | 364/474 |
| 4,092,720 | 5/1978 | Carey | 364/474 |
| 4,368,511 | 1/1983 | Imazeki | 364/474 |
| 4,547,855 | 10/1985 | Lanyi et al. | 364/474 |

FOREIGN PATENT DOCUMENTS 0113110  7/1982  Japan .

OTHER PUBLICATIONS

Translation of Pertinent Part of JP0113110-82.

Primary Examiner—Joseph Ruggiero
Assistant Examiner—Allen MacDonald
Attorney, Agent, or Firm—Staas & Halsey

[57] ABSTRACT

A numerical control system of a machine tool or the like has a numerical control section and a programmable controller section for executing sequential control of a machine based on control signals from the numerical control section. Miscellaneous function instructions from the numerical control section are divided into a plurality of groups and miscellaneous function code signals specified for each group are outputted in parallel. The programmable controller section executes sequential control of the machine on the basis of the miscellaneous function code signals of each group received in parallel from the numerical control section.

5 Claims, 7 Drawing Figures

| CODE | FUNCTION | CODE | FUNCTION |
|---|---|---|---|
| M00 | PROGRAM STOP | M46 | UNASSIGNED |
| M01 | OPTIONAL STOP | M47 | UNASSIGNED |
| M02 | END OF PROGRAM | M48 | CANCEL OVERRIDE DEACTIVATION |
| M03 | SPINDLE CLOCKWISE ROTATION | M49 | OVERRIDE DEACTIVATION |
| M04 | SPINDLE COUNTER-CLOCKWISE ROTATION | M50 | COOLANT 3 |
| M05 | SPINDLE STOP | M51 | COOLANT 4 |
| M06 | TOOL CHANGE | M52 – M54 | UNASSIGNED |
| M07 | COOLANT 2 | M55 | TOOL LINEAR SHIFT TO POSITION 1 |
| M08 | COOLANT 1 | M56 | TOOL LINEAR SHIFT TO POSITION 2 |
| M09 | COOLANT STOP | M57 – M59 | UNASSIGNED |
| M10 | CLAMP 1 | M60 | CHANGE WORKPIECE |
| M11 | UNCLAMP 1 | M61 | WORKPIECE LINEAR SHIFT TO POSITION 1 |
| M12 | UNASSIGNED | M62 | WORKPIECE LINEAR SHIFT TO POSITION 2 |
| M13 | SPINDLE CLOKWISE ROTATION AND COOLANT | M63 – M67 | UNASSIGNED |
| M14 | SPINDLE COUNTER-CLOCKWISE ROTATION AND COOLANT | M68 | CLAMP 2 |
| M15 | POSITIVE DRIVE | M69 | UNCLAMP 2 |
| M16 | NEGATIVE DRIVE | M70 | UNASSIGNED |
| M17 | UNASSIGNED | M71 | SWIVEL SHIFT WORKPIECE TO POSITION 1 |
| M18 | UNASSIGNED | M72 | SWIVEL SHIFT WORKPIECE TO POSITION 2 |
| M19 | SPINDLE STOP AT PREDETERMINED ANGULAR POSITION | M73 – M77 | UNASSIGNED |
| M20 – M29 | UNASSIGNED | M78 | CLAMP 3 |
| M30 | END OF TAPE | M79 | UNCLAMP 3 |
| M31 | INTERLOCK BYPASS | M80 – M89 | UNASSIGNED |
| M32 – M35 | UNASSIGNED | M90 – M99 | UNASSIGNED |
| M36 | FEED RANGE 1 | | |
| M37 | FEED RANGE 2 | | |
| M38 | SPINDLE SPEED RANGE 1 | | |
| M39 | SPINDLE SPEED RANGE 2 | | |
| M40 – M45 | GEAR CHANGES | | |

NUMERICAL CONTROL SYSTEM WITH PLURAL GROUPS OF MISCELLANEOUS FUNCTIONS

BACKGROUND OF THE INVENTION

1. Field of the Invention

This invention relates to a numerical control system for controlling a machine such as a machine tool by a numerical control section and a programmable controller section. More particularly, the invention relates to a numerical control system adapted to rapidly execute processing of miscellaneous functions.

2. Related Art

Machines controlled by a numerical control unit (CNC) having an internal microcomputer are becoming more popular and great strides are being made in automation and conservation of energy in the machining field.

FIG. 4 is a block diagram illustrating the general features of a numerical control system for a machine tool. In the Figure, numeral 1 denotes a numerical control (NC) section constructed about a microcomputer for outputting numerical control signals based on a machining program created by editing NC command data read in from an NC tape of a predetermined format. Numeral 2 designates a programmable controller (PC) section for sequentially controlling a magnetics circuit 6 of a machine tool based on a control signal produced by the NC section 1. The PC section consists of a microcomputer having a central processor, a memory for storing programs and data and the like, etc. Numeral 3 denotes an input/output circuit connected to a machine control panel 5, the magnetics circuit 6 and an M-, S and T-function executing unit 7. Connected to the M-, S-, and T-function executing unit 7 via a spindle amplifier is a spindle motor 8. The system is adapted to specify the number of revolutions of the machine tool spindle (S-function) or the number of a tool to be changed (T-function), and to specify miscellaneous function (M-function) instructions for various operations to be performed by the machine tool so that the machine tool will execute these operations. Numeral 9 denotes a velocity control unit for exercising control in such a manner that the velocity of a feed motor 10 will be controlled by a velocity command issued by the NC section 1.

Though the primary task of a machine tool is machining such as cutting and turning, there are many miscellaneous tasks which a machine tool carries out to perform such machining. For instance, these tasks include loading and unloading of workpieces, starting and stopping the spindle motor, turning a cutting oil flow on and off and selecting tools. These miscellaneous tasks are dealt with by the PC section 2 based on a miscellaneous function instruction signal commanded by a two-digit numerical value which follows an M code outputted by the NC section 1.

FIG. 5 is a view for describing a machine interface for outputting miscellaneous function instruction signals read out from the NC section 1 to the PC section 2. M-code signals M11 through M28 specified by two binary coded decimal (BCD) digits and a code read command signal MF are sent from the NC section 1 to the PC section 2. The M-code signals are decoded in the PC section 2, so that the required actuators are driven in the sequence indicated in order that the commanded operaton may be performed. When the operation is completed, a completion signal FIN is sent to the NC section 1. The NC section 1 responds by turning off the code read command signal MF. The NC section 1 follows this by proceeding to the NC command of the next block through a sequence in which the completion signal in turned off FIN is turned off and then the M-code signal.

A time chart for this operation is shown in FIG. 6. FIG. 7 is an explanatory view illustrating examples of miscellaneous function instructions (hereafter referred to simply as codes) as well as functions corresponding thereto. The term "unassigned" indicates codes which allow new functions to be freely assigned and used for machine tools.

A major feature of a CNC constructed as described above is that it shortens machining time for a single workpiece in numerical control for automatic equipment or for line use. In a conventional numerical control system, however, if an M-function word specifies two or more M codes in one block of a machining program, only the last M code is treated as being effective. With a CNC of this type, only one M-function can be specified per block, following the sequence number of the conventional NC tape format. Accordingly, the prescribed machining of a workpiece begins after all of the necessary miscellaneous functions have been set in the PC section upon being read out of the NC section one at a time for each block. A problem that results is that machining time cannot be reduced.

SUMMARY OF THE INVENTION

An object of the present invention is to provide a numerical control system in which a plurality of M codes can be specified in one block and the miscellaneous functions can be outputted to the PC section in parallel, thereby enabling the miscellaneous functions in the PC section to be rapidly executed.

According to the present invention, there is provided a numerical control system having a numerical control section for outputting numerical control signals based on a machining program, and a programmable controller section for executing sequential control of a machine based on the control signals from the numerical control section. The numerical control section includes memory means in the numerical control section for storing miscellaneous function instructions divided into plural groups and interface means for outputting, to the programmable controller section, a specified miscellaneous function instruction from among the grouped miscellaneous function instructions as well as a code read command signal including a group number to which the instruction belongs. The programmable controller section includes decoding means for decoding the miscellaneous function instruction on the basis of the code read command signal sent by the numerical control section, and miscellaneous function executing means for executing sequential control of the machine in accordance with a plurality of decoded miscellaneous function instructions.

The present invention divides miscellaneous function instructions into a plurality of groups and simultaneously processes these grouped miscellaneous function instructions in parallel fashion. This makes it possible to shorten machining time and increase the amount of work performed per unit time.

BRIEF DESCRIPTION OF THE DRAWINGS

FIG. 1 is a view for describing an exemplary arrangement of miscellaneous function instruction signals according to the present invention;

FIG. 7 is a view for describing miscellaneous function codes and their functions.

DESCRIPTION OF THE PREFERRED EMBODIMENT

The present invention will now be described in detail with reference to the drawings. The M codes (M00–M99) shown in FIG. 7 are divided into several groups in the NC section and a control parameter for numerical control is defined for each group. For example, M00–M29 is group 1, M30–M59 is group 2, and M60–M99 is group 3.

Figure 1:
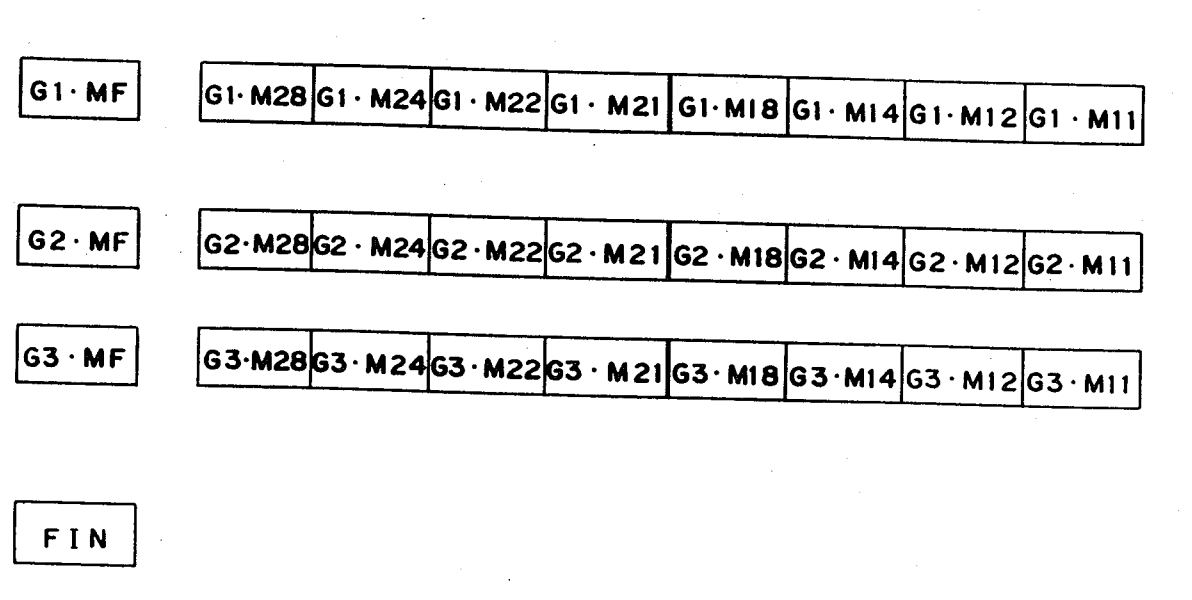

FIG. 1 is a view for describing output signals from the NC section in a case where the M codes are divided into these three groups. In FIG. 1, G1, G2, G3 represent the control parameters indicative of these groups, and MF represents a code read command signal. Therefore, when G1·MF, G2·MF, G3·MF are sent to the PC section as data output signals commanding the reading of the M-code signals of groups 1–3, they command the decoding of the M codes.

Further, in FIG. 1,

G1·M28–G1·M11
G2·M28–G2·M11
G3·M28–G3]M11 indicate M-code signals of the groups 1–3. The four bits on the left side of the Figure represent a BCD code for a second (tens) digit, and the four bits on the right side represent a BCD code for a first (ones) digit. Accordingly, one of the M codes M00–M29 is specified together with the data output signal G1·MF, one of the M codes M30–M59 is specified together with the data output signal G2·MF, and one of the M codes M60–M99 is specified together with the data output signal G3 MF. These are outputted to the PC section. FIN is an input signal sent back to the NC section 1 when an operation is completed.

Figure 2:
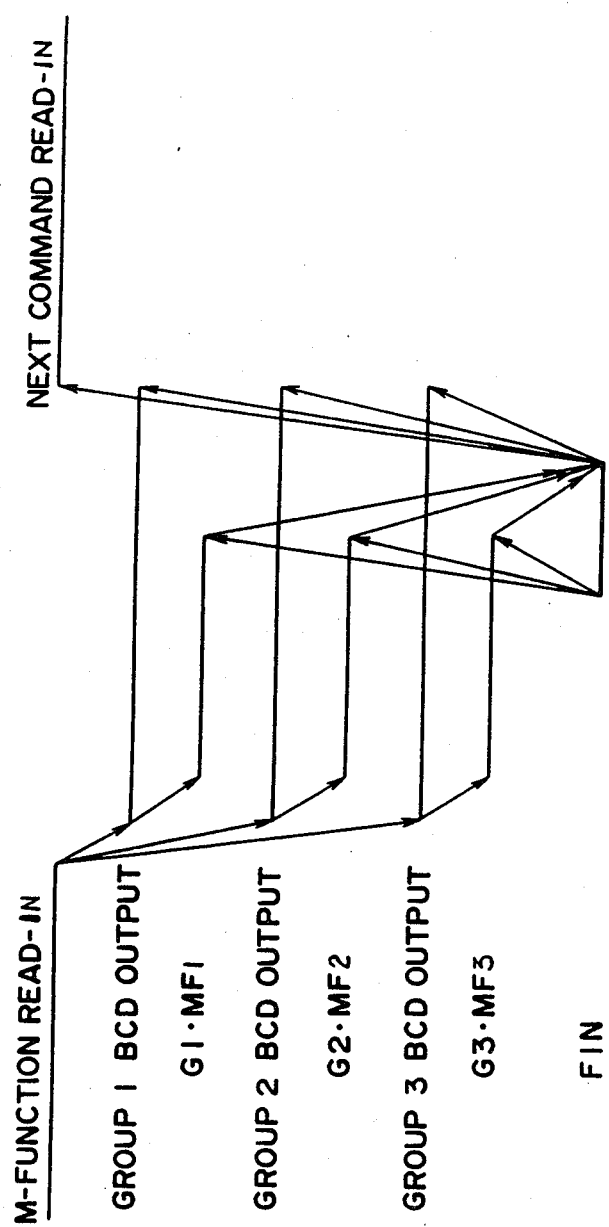
FIG. 2 is a time chart indicating output timing of miscellaneous function instruction signals according to the present invention.

FIG. 2 is a time chart indicating the output timing of the miscellaneous function instruction signals according to the present invention. The miscellaneous function instruction output operation will now be described with reference to FIG. 2.

In accordance with the present invention, when an M-function instruction is read from a machining program by the NC section 1, the data output signals G1·MF, G2·MF, G3·MF of the respective groups are outputted simultaneously in parallel fashion together with the BCD output of group 1, the BCD output of group 2 and the BCD output of group 3. The PC section 2 decodes these M-code signals as the corresponding miscellaneous function instructions and controls various actuators necessary for the machine tool in the sequence decided, thereby causing the machine tool to perform the operation commanded. For example, when a single machining operation is performed, it is necessary that spindle rotation, coolant and chuck loading be set. In accordance with the present invention, these miscellaneous function instructions can be processed in the PC section simultaneously in parallel fashion.

Next, upon completion of these various operations, the completion signal FIN is sent to the NC section 1, which turns off the code read command signal MF of each group. The NC section 1 then turns off the completion signal FIN, turns off the BCD output of each group and then proceeds to the NC command of the next block.

Thus, according to the present invention, the machining time of a workpiece can be shortened since various M functions can be processed simultaneously in parallel.

According to the embodiment shown in FIG. 1, the M-code instructions are composed of four bits for each digit, for a total of eight bits. However, depending upon the number of groups into which division is made, the higher order digit need not be composed of four bits, thus making it possible to further reduce the number of bits in the M-code signal.

Figure 3:
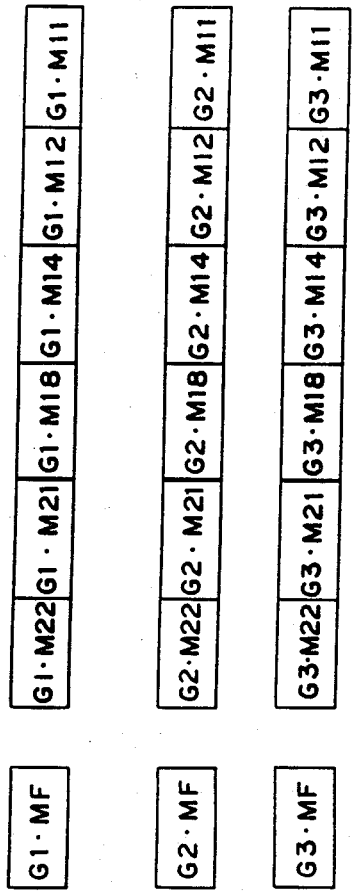
FIG. 3 is an explanatory view illustrating another exemplary arrangement of miscellaneous function instruction signals.
Figure 4:
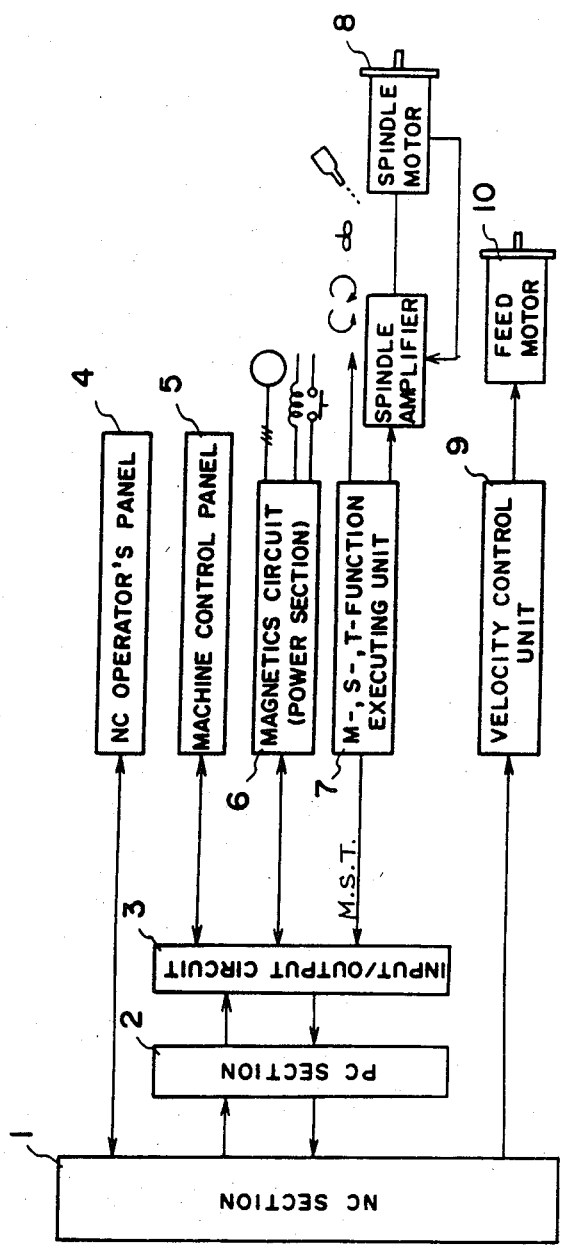
FIG. 4 is a block diagram illustrating a numerical control system of a machine tool.
Figure 5:
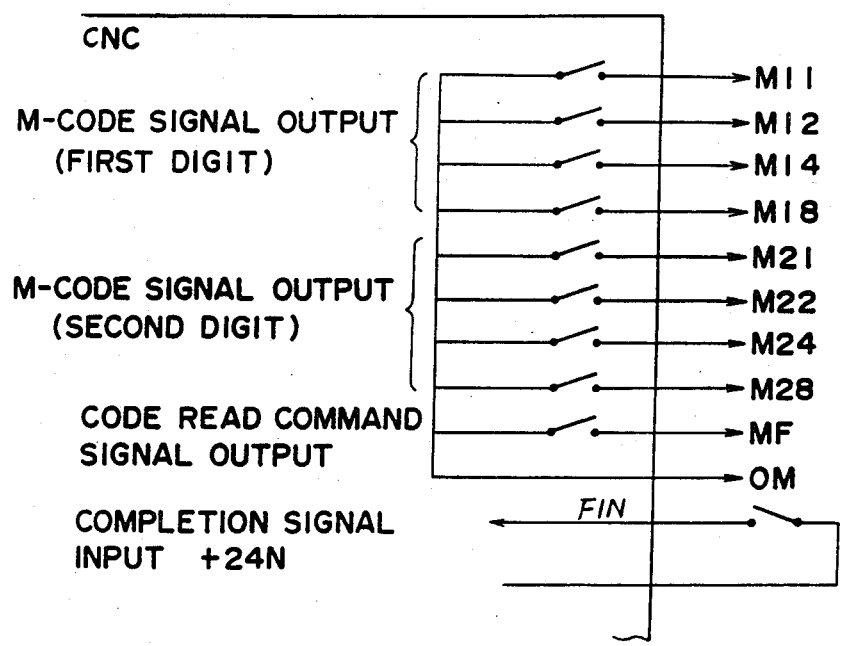
FIG. 5 is an explanatory view illustrating a machine interface for outputting miscellaneous function instruction signals.
Figure 6:
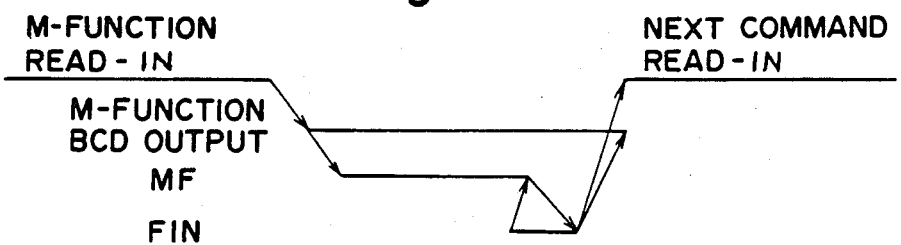
FIG. 6 is a time chart of miscellaneous function instruction signals according to the prior art.

By way of example, a BCD code of six bits (two bits for the higher order digit + four bits for the lower order digit) will suffice if the system configuration adopted for the divided miscellaneous function instructions is such that correspondence is established between M00–M29 and the BCD codes of 00–29 of group 1, between M30–M59 and the BCD codes of 00–29 of group 2, and between M60–M99 and the BCD codes of 00–39 of group 3, as illustrated in FIG. 3.

Further, as a method of dividing the miscellaneous function instructions in a way separate from that of the above-described embodiment, the type of machining performed by the machine tool is taken into consideration and grouping suitable for executing the miscellaneous function instructions in parallel is performed anew. This reduces the effect on a system of the present invention caused by the restriction that miscellaneous function instructions belonging to the same group cannot be specified simultaneously.

The present invention is not limited to the illustrated embodiment but obviously can be applied in a CNC of a construction in which the PC section is included in the NC main body. Various modifications of this kind are possible in accordance with the gist of the present invention and are within the scope of the invention.

Thus, the numerical control system according to the present invention makes it possible to process a plurality of miscellaneous function instructions simultaneously in parallel fashion and therefore is well-suited for use in the numerical control of a machine tool that requires execution of plural miscellaneous functions when performing a single machining operation.

What is claimed is:

1. A numerical control system for controlling a machine based on a machining program, comprising:
   a numerical control section for outputting numerical control signals based on the machining program, comprising:
      memory means for storing miscellaneous function instructions divided into plural groups; and
      interface means for outputting a specific miscellaneous function instruction from among the divided miscellaneous function instructions as well as a code read command signal including a group number to which the specific miscellaneous function instruction belongs; and a programmable controller section, operatively connected to the numerical control section and the machine, for executing sequential control of the machine based on the numerical control signals from said numerical control section, comprising:

decoding means for decoding the specific miscellaneous function instruction on the basis of the code read command signal sent by the numerical control section; and miscellaneous function executing means for executing the sequential control of the machine in accordance with a plurality of decoded miscellaneous function instructions.

2. A numerical control system according to claim 1, wherein the specific miscellaneous function instruction outputted from said interface means is indicated by an M-code signal including two binary coded decimal digits.

3. A numerical control system according to claim 1, wherein the miscellaneous function instructions stored in said memory means of said numerical control section are divided into plural groups by a grouping suitable for processing the miscellaneous function instructions in parallel.

4. A numerical control system controlling a machine, comprising:

a numerical control section for outputting numerical control signals in dependence upon numerical control command data, the numerical control signals including miscellaneous function codes, said numerical control section including output means for outputting at least two different miscellaneous function codes in parallel; and a programmable controller section, operatively connected to said numerical control section, for executing sequential control of the machine in dependence upon the numerical control signals, said programmable controller section including execution means for substantially simultaneously executing the miscellaneous functions in dependence upon the at least two different miscellaneous codes.

5. A numerical control system according to claim 4, wherein the miscellaneous function codes are divided into at least two groups, and wherein each of the at least two different miscellaneous functions output by said output means is a member of a different one of said at least two groups.

* * * * *